(12) United States Patent
Engberg et al.

(10) Patent No.: US 9,694,369 B2
(45) Date of Patent: Jul. 4, 2017

(54) AIR PURIFIER DEVICE WITH IONIZING MEANS

(71) Applicant: BLUEAIR AB, Stockholm (SE)

(72) Inventors: Elin Engberg, Stockholm (SE); Johan Wennerström, Stockholm (SE)

(73) Assignee: BLUEAIR AB, Stockholm (SE)

(*) Notice: Subject to any disclaimer, the term of this patent is extended or adjusted under 35 U.S.C. 154(b) by 182 days.

(21) Appl. No.: 14/548,364

(22) Filed: Nov. 20, 2014

(65) Prior Publication Data
US 2015/0231645 A1    Aug. 20, 2015

(30) Foreign Application Priority Data

Feb. 18, 2014   (EP) .................................. 14155642

(51) Int. Cl.
*B03C 3/47* (2006.01)
*B03C 3/36* (2006.01)
*B03C 3/41* (2006.01)

(52) U.S. Cl.
CPC .............. *B03C 3/368* (2013.01); *B03C 3/41* (2013.01); *B03C 3/47* (2013.01); *B03C 2201/10* (2013.01)

(58) Field of Classification Search
CPC combination set(s) only.
See application file for complete search history.

(56) References Cited

U.S. PATENT DOCUMENTS

| 521,862 A | 6/1894 | McConnell et al. |
|---|---|---|
| 1,502,862 A | 7/1924 | Menk |
| 1,921,153 A | 8/1933 | Cantwell |
| 2,415,621 A | 2/1947 | Arnhym |

(Continued)

FOREIGN PATENT DOCUMENTS

| CN | 2130247 Y | 4/1993 |
|---|---|---|
| CN | 101010142 A | 8/2007 |

(Continued)

OTHER PUBLICATIONS

Office Action (Rejection) issued on May 18, 2015, by the U.S. Patent Office in corresponding U.S. Appl. No. 14/548,655. (16 pages).

(Continued)

*Primary Examiner* — Amber R Orlando
*Assistant Examiner* — Sonji Turner
(74) *Attorney, Agent, or Firm* — Buchanan Ingersoll & Rooney P.C.

(57) ABSTRACT

An air purifier device includes a chamber defined by a side wall arranged to guide an air flow through the air purifier device. The air purifier device further includes at least one emitter electrode and at least one collector plate electrode arranged to ionize airborne particles. The at least one emitter electrode is arranged to extend from the side wall and inwards in the chamber and the at least one collector plate electrode is arranged to extend from the side wall and inwards in the chamber. The air purifier device enables the side wall to be manufactured from e.g. plastic, or other non-conductive or non-magnetic material. This in turn may enable a lower weight of the air purifier device and facilitated manufacturing, as the side walls of the chamber e.g. may be formed by plastic moulding just as many other parts of the air purifier device.

15 Claims, 6 Drawing Sheets

(56) References Cited

U.S. PATENT DOCUMENTS

| | | | |
|---|---|---|---|
| 3,256,680 | A | 6/1966 | Coombs |
| 3,937,189 | A | 2/1976 | Beck |
| 4,634,342 | A | 1/1987 | Rodewald |
| 4,730,980 | A | 3/1988 | Hughes |
| 4,749,390 | A | 6/1988 | Burnett et al. |
| 4,781,526 | A | 11/1988 | Mead et al. |
| 5,266,090 | A | 11/1993 | Burnett |
| 5,422,795 | A | 6/1995 | Liu |
| 5,452,713 | A | 9/1995 | Vipond et al. |
| 5,456,741 | A * | 10/1995 | Takahara ............ B03C 3/12 95/6 |
| 5,601,636 | A | 2/1997 | Glucksman |
| 5,615,999 | A | 4/1997 | Sukup |
| 5,641,343 | A | 6/1997 | Frey |
| 5,753,000 | A | 5/1998 | Chiu et al. |
| 5,753,002 | A | 5/1998 | Glucksman |
| 5,803,709 | A | 9/1998 | Matthews et al. |
| 5,997,619 | A | 12/1999 | Knuth |
| 6,174,340 | B1 | 1/2001 | Hodge |
| 6,447,586 | B1 | 9/2002 | Campbell |
| 6,450,760 | B1 | 9/2002 | Furukawa et al. |
| 6,989,051 | B2 | 1/2006 | Parisi et al. |
| 7,074,250 | B1 | 7/2006 | Chipner et al. |
| 7,485,174 | B2 * | 2/2009 | Wang ............ B03C 3/09 96/79 |
| 7,537,647 | B2 | 5/2009 | Adair et al. |
| 7,597,750 | B1 * | 10/2009 | Krigmont ............ B03C 3/014 55/DIG. 38 |
| 7,638,104 | B2 * | 12/2009 | Taylor ............ B03C 3/12 422/121 |
| 7,806,952 | B2 | 10/2010 | Fox et al. |
| 8,268,058 | B2 * | 9/2012 | Wu ............ B03C 3/09 95/78 |
| 9,039,815 | B2 * | 5/2015 | Dunn ............ B03C 3/41 96/70 |
| 9,073,062 | B2 * | 7/2015 | Dunn ............ B03C 3/47 |
| 9,238,230 | B2 * | 1/2016 | Dunn ............ B03C 3/45 |
| 2002/0073664 | A1 | 6/2002 | Campbell et al. |
| 2002/0088213 | A1 | 7/2002 | McSweeney et al. |
| 2003/0202879 | A1 | 10/2003 | Huang et al. |
| 2004/0163542 | A1 | 8/2004 | Huang |
| 2004/0182054 | A1 | 9/2004 | Kaylan et al. |
| 2005/0082160 | A1 * | 4/2005 | Botvinnik ............ A61L 9/22 204/164 |
| 2005/0194583 | A1 * | 9/2005 | Taylor ............ B03C 3/12 257/10 |
| 2006/0016333 | A1 | 1/2006 | Taylor et al. |
| 2006/0016335 | A1 | 1/2006 | Cox et al. |
| 2006/0053758 | A1 | 3/2006 | Wu et al. |
| 2006/0110272 | A1 | 5/2006 | Moore et al. |
| 2006/0201119 | A1 | 9/2006 | Song |
| 2006/0277875 | A1 | 12/2006 | Schuld |
| 2007/0070602 | A1 | 3/2007 | Huang |
| 2007/0277487 | A1 | 12/2007 | Thurin et al. |
| 2008/0028733 | A1 | 2/2008 | Paterson et al. |
| 2008/0066620 | A1 | 3/2008 | Wang |
| 2011/0064595 | A1 | 3/2011 | Kuang |
| 2011/0100221 | A1 | 5/2011 | Wu |
| 2011/0113963 | A1 * | 5/2011 | Wu ............ B03C 3/09 96/19 |
| 2011/0115415 | A1 * | 5/2011 | Hong ............ B03C 3/025 315/326 |
| 2012/0111188 | A1 | 5/2012 | Zanganeh et al. |
| 2012/0180666 | A1 | 7/2012 | Lim et al. |
| 2013/0118349 | A1 * | 5/2013 | Dunn ............ B03C 3/45 95/78 |
| 2013/0186270 | A1 * | 7/2013 | Dunn ............ B03C 3/41 95/57 |
| 2013/0299717 | A1 * | 11/2013 | Fukada ............ H01T 19/00 250/426 |
| 2014/0283686 | A1 * | 9/2014 | Dunn ............ B03C 3/47 95/78 |
| 2015/0231542 | A1 | 8/2015 | Wennerström et al. |
| 2015/0231543 | A1 | 8/2015 | Wennerström et al. |
| 2015/0354578 | A1 | 12/2015 | Avedon |

FOREIGN PATENT DOCUMENTS

| | | | | |
|---|---|---|---|---|
| CN | 101577397 | * | 11/2009 | ............ A61L 9/22 |
| CN | 102 039 222 | A | 5/2011 | |
| CN | 204602410 | U | 9/2015 | |
| GB | 449903 | A | 6/1936 | |
| GB | 488781 | A | 7/1938 | |
| JP | S 61-153159 | A | 7/1986 | |
| JP | S 62-22937 | A | 1/1987 | |
| RU | 2 259 862 | C2 | 9/2005 | |
| SE | 9 804 475 | C2 | 6/2000 | |
| WO | WO 95/34366 | A1 | 12/1995 | |
| WO | WO 98/50162 | A1 | 11/1998 | |
| WO | WO 00/30732 | A1 | 6/2000 | |
| WO | WO 2006/071503 | A1 | 7/2006 | |
| WO | WO 2013/165242 | A1 | 11/2013 | |
| WO | WO 2014/007558 | * | 1/2014 | ............ B03C 3/38 |
| WO | WO 2014/007558 | A1 | 1/2014 | |

OTHER PUBLICATIONS

Office Action issued by the U.S. Patent and Trademark Office in U.S. Appl. No. 14/548,551, mailed May 27, 2016, 14 pages.
Office Action issued by the U.S. Patent and Trademark Office in U.S. Appl. No. 14/548,655, mailed Nov. 2, 2015, 9 pages.
Office Action issued by the U.S. Patent and Trademark Office in U.S. Appl. No. 14/548,655, mailed Jun. 29, 2016, 13 pages.
Extended European Search Report mailed Jul. 7, 2014 in EP 14155644.9, 6 pages, EPO, Munich, DE.
Extended European Search Report mailed Jul. 7, 2014 in EP 14155645.6, 6 pages, EPO, Munich, DE.
Extended European Search Report mailed Aug. 5, 2014 in EP 14155642.3, 8 pages, EPO, Munich, DE.
Official Action issued in Chinese Patent Application 201510015117.1, mailed Jun. 27, 2016, 10 pages, State Intellectual Property Office of the P.R.C., CN, and English-language translation (12 pages).
Wennerström et al., U.S. Appl. No. 14/548,551, entitled "Air Purifier Device With Coupling Mechanism," filed in U.S. Patent and Trademark Office on Nov. 20, 2014.
Wennerström et al., U.S. Appl. No. 14/548,655, entitled "Air Purifier Device With Fan Duct," filed in the U.S. Patent and Trademark Office on Nov. 20, 2014.

* cited by examiner

AIR PURIFIER DEVICE WITH IONIZING MEANS

CROSS REFERENCE TO RELATED APPLICATIONS

The present application claims the benefit of European Application No. 14155642.3, filed on Feb. 18, 2014. The entire contents of European Application No. 14155642.3 are hereby incorporated herein by reference in their entirety.

FIELD OF THE INVENTION

The present invention generally relates to the field of air purifier devices. In particular, the present invention relates to air purifier devices with means for ionizing airborne particles.

BACKGROUND OF THE INVENTION

Airborne particles may irritate e.g. eyes and mucous membranes. The smaller the particles, the greater problems may potentially be caused, as transportation of particles, via the airways into the lungs, and further into the blood stream, is facilitated with reduced particle size.

Ionic air purification is increasingly used indoors. Such air purification utilizes the principle of positively charge particles being attracted by negatively charged surfaces and vice versa. Hence, if an voltage is applied between a first, preferably pointy, emitter electrode and a second plate electrode, the second plate electrode may serve as a collector of charged particles.

If the difference in electric potential between the two electrodes is sufficiently large, the intermediate air will be excited by an electromagnetic, EM, field, such that intermediate airborne particles may become ionized, and subsequently deposit, or precipitate, on the second plate electrode.

U.S. Pat. No. 7,806,952 discloses an air purifier device comprising an ionizing system. The ionizing system is placed within an air outlet of the air purifier device, and comprises a high voltage electrode arranged on a distal end protruding from a portion of a fan housing. An alternating voltage field is generated from the first electrode and causes ionized particles to deposit on the housing by bleeding accumulated charge to a lower potential bleeding electrode arranged around the air outlet. Bleeding of the charge is possible because the housing has certain conductive properties, i.e. it is not a perfect insulator. The bleeding electrode has a significant surface area in order to discharge the excessive charges. The high voltage electrode is arranged close to the center of the opening, so as to create a voltage field across the entire opening of the outlet.

This air purification principle is sometimes referred to as electrostatic precipitation, ESP, or electrostatic cleaning. The principle is usually effective only within short range from the collector.

SUMMARY OF THE INVENTION

It would be advantageous to achieve an alternative air purifier device compared to known devices. In particular, it would be desirable to provide a more durable air purifier device with reduced weight and improved manufacturing properties. Further, it would be advantageous to enable increased emission of anions into the ambient air, to enable reducing the amount of cations in the ambient air.

To better address one or more of these concerns, an air purifier device having the features defined in the independent claim is provided. Preferable embodiments are defined in the dependent claims.

Hence, according to an aspect, an air purifier device is provided. The air purifier device comprises a chamber defined by a side wall arranged to guide an air flow through the air purifier device. The air purifier device further comprises at least one emitter electrode and at least one collector plate electrode arranged to ionize airborne particles. The at least one emitter electrode is arranged to extend from the side wall and inwards in the chamber and the at least one collector plate electrode is arranged to extend from the side wall and inwards in the chamber.

The air purifier device according to this aspect enables the application of a combination of ESP, and flocculation. According to ESP, undesired charged particles in a room will be attracted by a low potential surface. Hence, the at least one collector plate electrode may attract cations present in the room, e.g. such that they may deposit upon the collector plate electrode. The collector electrode may e.g. be a ground electrode (or earth electrode).

In known air purifier devices, the collector electrode is typically integrated in the side wall of the chamber. For example, the entire side wall may be made of metal so as to form the collector electrode. In the air purifier device according to the present aspect, the collector plate electrode instead extends out from the side wall, which enables the side wall to be manufactured from e.g. plastic, or other non-conductive or non-magnetic material. This in turn may enable a lower weight of the air purifier device and facilitated manufacturing, as the side walls of the chamber e.g. may be formed by plastic moulding just as many other parts of the air purifier device.

The air purifier device according to this aspect may further advantageously enable a reduced EM field strength in the center of the chamber, where a fan motor is usually arranged, while still achieving an EM field strength strong enough to ionize the air in other parts of the chamber. Hence, accumulation of electrical charge and accumulation of particles on the motor may advantageously be reduced, while ionization efficiency may be maintained. A further advantage is that the risk of the motor inadvertently trapping the anions may be reduced. Reducing the aggregation of charge build-up on the motor has the further effect of potentially increasing the useful life of the motor, thereby providing a more durable air purifier device.

According to an embodiment, the at least one collector plate electrode may extend along a main direction of a main air flow (spontaneous or forced) through the air purifier device. This is advantageous as it facilitates the air flow through the air purifier device and reduces generation of turbulence, such as eddy, i.e. minor air currents moving, typically in a circular motion, contrary to or separate from the direction of a main air current. Further, it increases the amount of charged particles attracted to the collector plate, as the particles travel along the extension of the collector plate in the EM field.

In an embodiment, the at least one emitter electrode and the at least one collector plate may be arranged beside each other in a row extending along the side wall in a direction transverse to the main air flow direction, whereby the produced EM field may generally extend transverse to the air flow.

According to an embodiment, the air purifier device may comprise at least two emitter electrodes and at least two collector plate electrodes. The at least two emitter electrodes may be arranged alternatingly with the at least two collector plate electrodes. This is advantageous in that it enables one of the at least two collector plate electrodes to operate as a main collector plate electrode for the two separate emitter electrodes located on opposite sides of that collector plate. In other words, one of the at least two collector plate electrodes may provide ground, potential such that two ionizing EM fields may be created (which may be referred to as two component EM fields together forming a resultant EM field). A further advantage is that the one of the at least two collector plate electrodes may in a more efficient way collect generated by the two ionizing EM fields, thereby preventing cations from being forwarded out from the chamber and into the ambient air space to be purified.

According to an embodiment, the air purifier device may comprise three emitter electrodes and two collector plate electrodes, wherein each one of the two collector plate electrodes is arranged between two of the three emitter electrodes. This embodiment enables the generation of four ionizing EM fields, two of which are excited between the two collective plate electrodes and one common emitter electrode.

According to an embodiment, a first one of the emitter electrodes may be arranged opposite to a second one of the emitter electrodes, a first one of the two collector plate electrodes may be arranged between the first emitter electrode and a third one of the emitter electrodes. Further, a second one of the two collector plate electrodes may be arranged between the second emitter electrode and the third emitter electrode. The inventors have realized that arranging the electrodes according to the present embodiment surprisingly provides an improved EM field in the chamber, achieving an increased ionization rate, which in turn improves the clean air delivery rate (CADR) of the air purifier device.

According to an embodiment, the air purifier device may further comprise a fan for producing the air flow, and a motor for driving the fan, thereby increasing the air flow through the chamber, which increases the clean air delivery rate. Though flocculation may reduce the amount of particles migrating in the room air, it does not permanently remove them from the room. As a particle cluster hits a surface it may release its charge, "un-cluster", or de-flocculate and may subsequently be stirred back up into the air. Therefore, mechanical filtering and forced ventilation may be applied in combination with ionic flocculation, such that the particle clusters may be trapped in a filter, which may be positively charged. The present embodiment provides the advantage of enabling a forced, and controllable, air flow through the chamber, which in turn creates circulation of air in the room, whereby ionized particles and flocculated clusters of particles may be retrieved to the air purifier device, which further increases the clean air delivery rate of the air purifier device.

According to an embodiment, each emitter electrode may be arranged closer to at least one of the two collector plate electrodes than to the motor. This embodiment provides the advantage of reducing the risk for electric charge accumulating in the motor, which may be detrimental to components comprised in, or galvanically connected to, the motor. A further advantage is that the risk of the motor serving as an inadvertent ion collector electrode is reduced. Hence, the deposition of particles upon the motor may further be reduced.

According to an embodiment, the chamber may be arranged on a downstream side of the fan. This may advantageously prevent deposition of particles upon the motor, as the particles will follow the air flow away from the fan, instead of towards the fan.

According to an embodiment, the side wall may be flared towards an air exhaust of the air purifier device. This facilitates the air circulation in a room in which the air purifier device is placed, which in turn promotes retrieving the ionized particles and clustered particles to the air purifier device where these particles may preferably adhere to a filter of the air purifier device.

For example, the chamber may form part of a fan duct of the air purifier device for guiding the air flow produced by the fan. The fan duct may extend in an upright direction of the air purifier device. The air purifier device may further comprise an air intake arranged below a lower end of the fan duct, and an exhaust arranged at an upper end of the fan duct so as to exhaust air in an upward direction from the air purifier device when the air purifier device is in use. The fan duct may be flared in direction from an intermediate portion of the fan duct towards both it ends, and the fan is arranged at least partly in the intermediate portion. In the present example, the air flowing into the air purifier device converges towards the intermediate portion of the fan duct, and is exhausted divergently upwards. The convergent inflow of air from below in combination with the divergent outflow upwards provides a facilitated circulation of air through the room and through the air purifier device standing in the room, thereby enabling more ionized particles and clustered particles to be retrieved to the air purifier device, whereby the air cleaning performance of the air purifier device is improved.

According to an embodiment, portions of the side wall at which the emitter electrodes are arranged may be arranged further from a centre of the chamber than portions of the side wall at which the collector plate electrodes are arranged. This may further promote attraction of ions to the collector plate electrodes rather than to e.g. the motor, thereby contributing to reducing the risk of the motor serving as an inadvertent ion collector electrode. Hence, the deposition of particles upon the motor may further be reduced. For example, the side wall may have at least one jutting portion, in which one of the emitter electrodes is arranged.

According to an embodiment, the chamber may have a rotational symmetric shape, for example a circular shape, or a squared shape or a combination thereof. For example, the lower portion of the chamber may be circular and the chamber may gradually transform into a squared shape towards the upper end of the chamber, which provides a more aerodynamic shape of the chamber, which facilitates the air flow through the chamber.

According to an embodiment, the side wall of the chamber may comprise an electrically insulating material. This may reduce the rate of ionized particles depositing on the side wall of the chamber, which in turn reduces the risk for static charge accumulating in portions of the air purifier device that are exposed to a user. For example, the chamber may be made of plastic, which provides a lower weight of the air purifier device and facilitates manufacturing.

According to an embodiment, the three emitter electrodes are brush electrodes. This reduces the likelihood for electric arcs and ozone generation.

Indoors, a surplus of positive ions is usually present around computer screens, household appliances, air-conditioners and other electronic equipment. Positive ions, which may be referred to as cations, in the air is generally considered to have negative health effects, and has been linked to e.g. negative effects on asthma, arthritis, heart disease and arterial hypertension. Negative ions, which may be referred to as anions, does not have the same negative health effects and are believed to counteract the negative effects of cations, as they may attract and neutralize the positive ions.

In an embodiment, a constant, negative, potential may be applied to the at least one emitter electrode, whereby mostly anions may be created by the applied EM field. This is an advantage over air purifier devices adapted to use alternating voltage to excite the EM field, which produces both cations and anions. Cations generated by other electronic equipment in the room (and preferably not by the EM field) may be collected by the collector plate electrode.

The majority of the anions generated by the air purifier device may migrate into the ambient air. An anion generated by the EM field may be attracted to a positively charged particle in the room and gradually form a cluster, in other words flocculate. As a particle cluster grows in size, its weight also increases, and it may eventually precipitate on the floor due to gravity.

Straggling anions in the chamber that do not migrate into the ambient air may be collected by the ground electrode to prevent precipitation on other parts of the air purifier device.

It is noted that embodiments of the invention relates to all possible combinations of features recited in the claims. Further, it will be appreciated that the various embodiments described for the device are all combinable with the method as defined in accordance with the second aspect of the present invention.

BRIEF DESCRIPTION OF THE DRAWINGS

This and other aspects will now be described in more detail in the following illustrative and non-limiting detailed description of embodiments with reference to the appended drawings.

All the figures are schematic, not necessarily to scale, and generally only show parts which are necessary in order to elucidate the embodiments, wherein other parts may be omitted. Like reference numerals refer to like elements throughout the description and drawings.

DETAILED DESCRIPTION OF EMBODIMENTS

Figure 1:
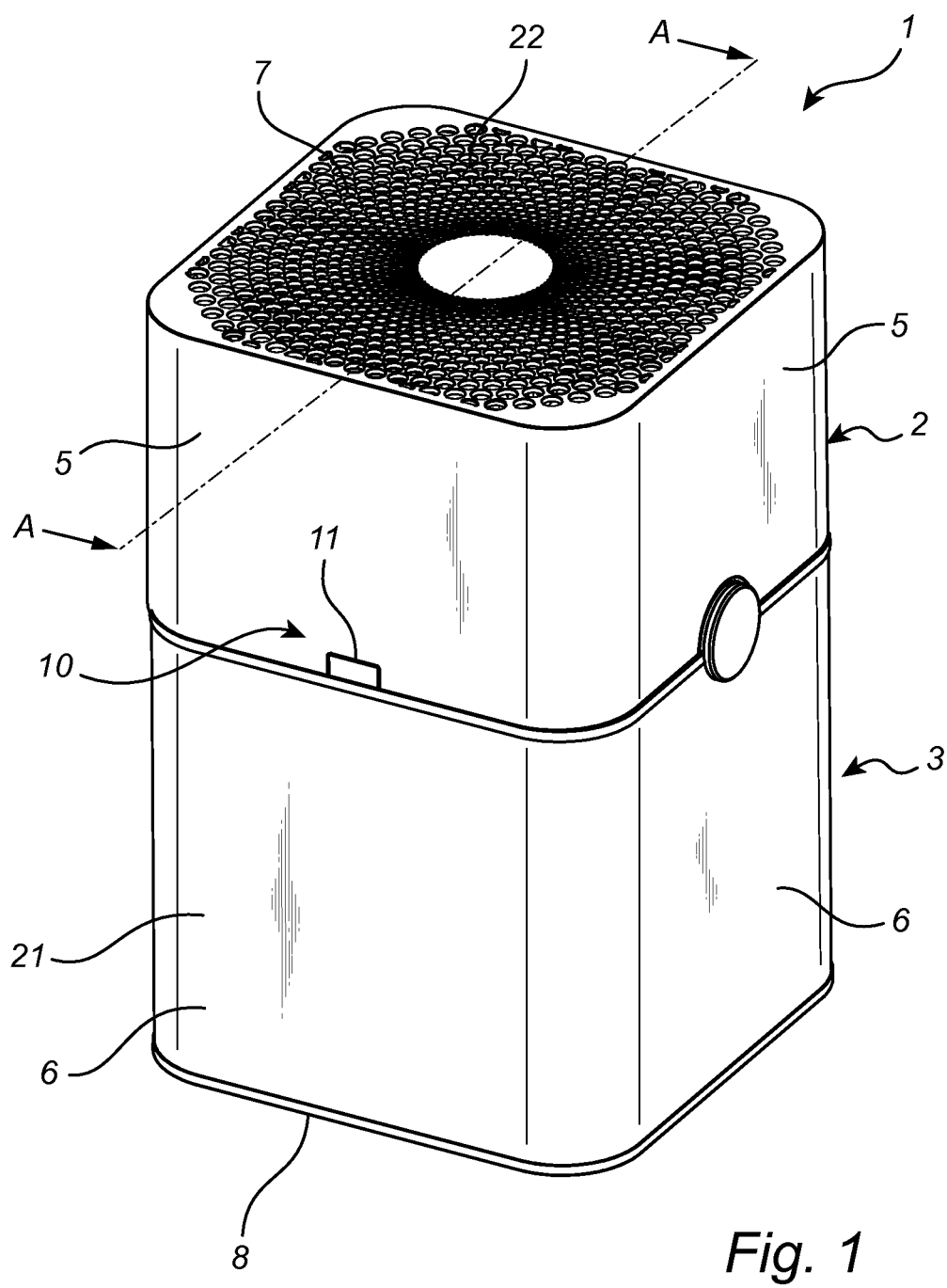
FIG. 1 shows an air purifier device.
Figure 2:
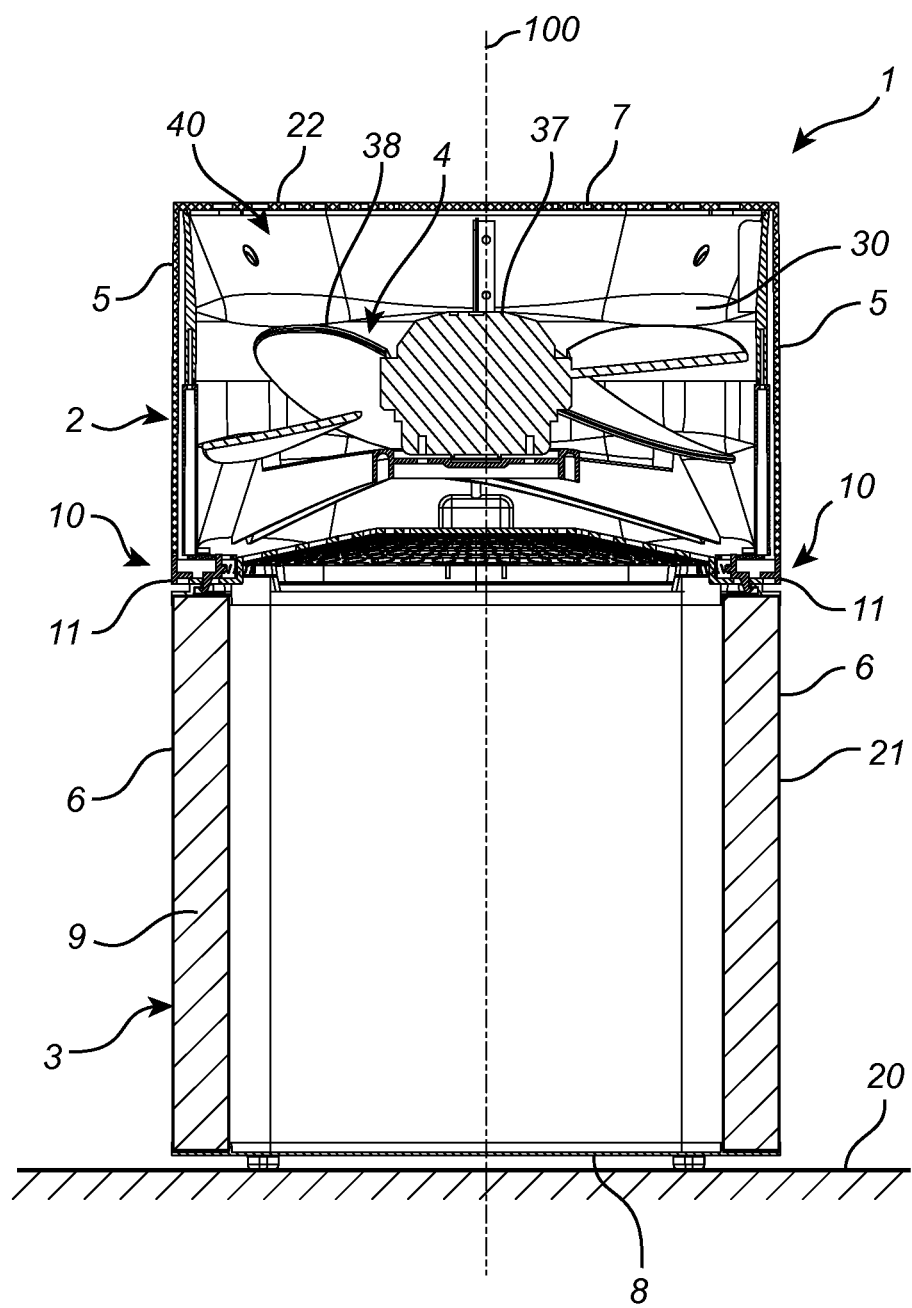
FIG. 2 is a cross-section taken along A-A in FIG. 1.

FIGS. 1 and 2 show an example of an air purifier device 1, which may be suitable for purifying air in indoor spaces, such as rooms in homes and the like domestic environments. The air purifier device 1 may comprise a fan 4 for producing an air flow through the air purifier device 1 and a filter 9 for filtering the air flow produced by the fan 4. The air purifier device 1 may further comprise an ionizing device 40 for ionizing air borne particles in the air flow produced by the fan 4. Preferably, the filter 9 may comprise a dielectric material, such as polypropylene, which facilitates attraction of ionized particles to the filter 9. For example, the filter 9 may be a filter as described in WO98/50162.

The air purifier device has a longitudinal (or vertical) axis 100 extending in an upright direction of the air purifier device 1 when the air purifier device 1 is positioned on the support surface 20 for use. In an embodiment, the air purifier device 1 may have a box-like shape, optionally with one or more rounded edges. For example, the air purifier device 1 may have a square-shaped cross-section (in a horizontal plane) with rounded corners, as illustrated in FIG. 1. Other shapes of the air purifier device 1 may also be envisaged, such as a cylindrical shape. A side wall may extend between a bottom wall 8 adapted to face, and preferably be supported on, the support surface 20 and a top wall 7. Preferably, opposite outer sides of the side wall may be substantially parallel with each other and transverse (such as perpendicular) to the bottom wall 8.

In an embodiment, the air purifier device 1 may be structurally separated into two parts: a filter unit 3, in which the filter 9 is arranged and a fan unit 2, in which the fan 4 may be arranged. The fan unit 2 may be arranged on top of the filter unit 3. For example, the fan unit 2 and the filter unit 3 may both be box-shaped, thereby together forming the box-shaped air purifier device 1. The side wall of the air purifier device 1 may be formed by the side wall 5 of the fan unit 2 and the side wall 6 of the filter unit 3. The filter 9 may be arranged along the side wall of the air purifier device 1, such as circumferentially around the side wall 6 of the filter unit 3. The filter 9 may be protected by a grid arranged outside the filter 9 so as to enclose the filter 9 in the filter unit 3. Optionally, the grid may on its outside be covered by a fabric cover.

In an embodiment, at least a portion of the side wall 6 of the filter unit 3 may form an air intake 21 of the air purifier device 1. Preferably, the air intake 21 may extend circumferentially around the air purifier device 1 so as to be able to take in air from several lateral directions, such as preferably approximately 360 degrees around the air purifier device 1. For example, the air intake 21 may be formed by all four sides of the side wall 6 of the filter unit 3.

In an embodiment, the air purifier device 1 may comprise an exhaust 22 arranged to exhaust air upwards (i.e. roughly along the longitudinal axis 100) from the air purifier device 1. For example, the exhaust 22 may be arranged in the top wall 7, such as in the form of an exhaust grille, as illustrated in FIGS. 1 and 2. The exhaust grille may preferably be free from openings larger than 12 mm, such as free from openings larger than 11 mm, thereby preventing a user's finger from accessing the fan 4.

In an embodiment, the air purifier device 1 may comprise a fan duct 30, in which the fan 4 may be arranged. For example, the fan duct 30 may be arranged in the fan unit 2. The fan duct 30 may extend in an upright direction of the air purifier device 1, i.e. along the longitudinal axis 100 of the air purifier device 1, towards the exhaust 22. The fan duct 30 may be formed by a piece of conduit arranged within the air purifier device 1 (as illustrated in FIG. 2).

Figure 3:
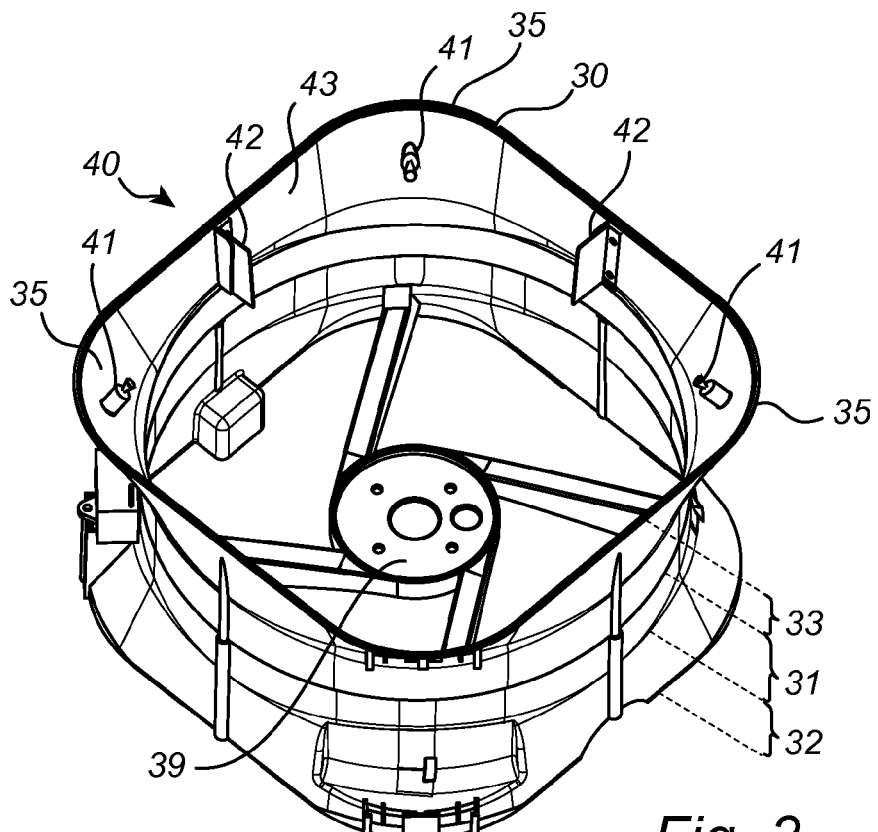
FIG. 3 is a perspective view of a fan duct and an ionizing device of the air purifier device.
Figure 4:
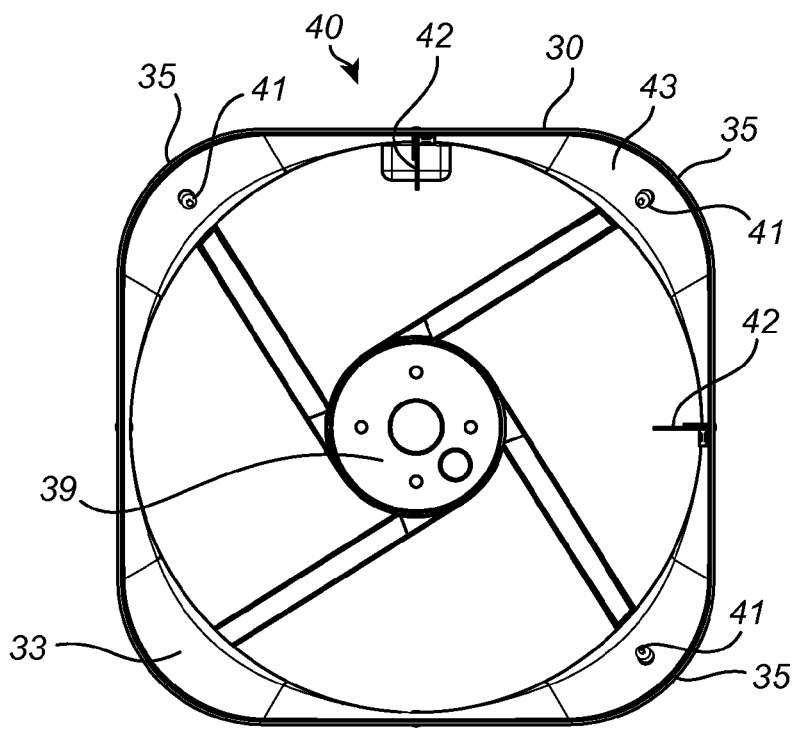
FIG. 4 is a top view of the fan duct and the ionizing device shown in FIG. 3.

Embodiments of the fan duct 30 will be described in more detail with reference to FIGS. 3 and 4. FIG. 3 is a perspective view of the fan duct 30, which for the sake of clarity is separated from the air purifier device 1, and FIG. 4 is a top view of the fan duct 30.

The fan duct 30 may comprise an intermediate portion 31, an upper flared portion 33 and a lower flared portion 32. Hence, the fan duct 30 is flared towards both its ends, whereby the intermediate portion 31 is narrower than the end portions of the fan duct 30. Preferably, the inner walls of the fan duct 30 may be smooth and, thus, free form sharp edges, corners or the like. In particular, the transition between the intermediate portion 31 and the flared portions 31, 32 may be smooth.

The fan 4 may be arranged at least partly within the intermediate portion 31. The diameter of the intermediate portion 31 may be adapted to (such as be slightly smaller than) the diameter of the fan 4. Preferably, the height (i.e. in direction along the longitudinal axis 100) of the blades 38 of the fan 4 may correspond to, or be slightly shorter than, the height (or length) of the intermediate portion 31 for reducing the amount of air passing beside instead between the blades 38 of the fan 4. Hence, the blades 38 of the fan 4 may preferably be completely contained in the intermediate portion 31. For example, the fan 4 may be centered (at least in the direction of the longitudinal axis 100) in the intermediate portion. The fan duct 30 may comprise a support structure 39 arranged to support the fan 4 in the fan duct 30.

In an embodiment, the intermediate portion 31 may have a circular cross-section (in the horizontal plane), thereby being adapted to the circular operation pattern of the fan 4. Further, the fan duct 30 may have square shaped ends, preferably with rounded corners 35, as illustrated in FIGS. 3 and 4. Preferably, the circular shape of the intermediate portion 31 may gradually transform into the square-like shape along the flared portions towards the ends of the fan duct 30.

In an embodiment, an inlet grille 36 (shown in FIG. 2) may be arranged at the lower end of the fan duct 30, which, in similarity with the exhaust grille (at the exhaust 22), preferably may be free from openings larger than 12 mm, such as free from openings larger than 11 mm, thereby preventing a user's finger from accessing the fan from the lower side of the filter unit 2. Further, the air intake area of the inlet grille 36 may be larger than the air exhaust area of the exhaust grille, for example by comprising more and/or bigger holes than the exhaust grille.

In an embodiment, the air purifier device 1 may comprise an ionizing device 40 arranged to ionize air borne particles in the air flow through the air purifier device 1. The Ionizing device 1 may e.g. be positioned in the fan duct 30, preferably on a downstream side of the fan 4. The ionizing device 1 may thus be positioned just before the exhaust 22 (with reference to the air flow direction).

Alternatively, the air purifier device may be arranged such that the ionizing device is arranged on an upstream side of the filter and/or the fan (not shown).

In an embodiment, the ionizing device 40 may comprise one or more emitter electrodes 41 connectable to a source of electric potential and one or more collector plate electrodes 42 connectable to ground, or virtual ground, potential, and arranged in a chamber (which may be referred to as an ionizing chamber). The emitter electrodes 41 e.g. may be formed as brush electrodes and/or pin electrodes e.g. made of carbon. The collector plate electrodes 42 may e.g. comprise pieces of sheet metal attached to the side wall 43. The chamber may e.g. be formed by the upper end portion 33 of the fan duct 30.

The chamber (e.g. the entire fan duct 30) may be made of (such as molded in) plastics. The collector plate electrodes 42 may extend from a side wall 43 of the chamber and inwards in the chamber (such as substantially towards the middle of the chamber), and preferably along (such as substantially parallel with) a main direction of the air flow (such as substantially along the longitudinal axis 100 of the air purifier device 1).

In the present example, the ionizing device 40 may comprise three emitter electrodes 41 and two collector plate electrodes 42, which provides an improved electrical field for ionizing air borne particles in the air flow. Preferably, a first one of the emitter electrodes 41 may be arranged opposite to a second one of the emitter electrodes 41, and a first one of the two collector plate electrodes 42 may be arranged between the first emitter electrode and a third one of the emitter electrodes 41. Further, a second one of the two collector plate electrodes 42 may be arranged between the second emitter electrode and the third emitter electrode. In the present example, the three emitter electrodes 41 may preferably be positioned in three of the four rounded corners 35 (forms jutting portions) of the square-like shaped chamber, and each collector plate electrode 42 may be positioned in-between two emitter electrodes 41, such as on one of the sides of the four-sided chamber, as illustrated in FIGS. 3 and 4. Hence, the emitter electrodes 41 and the collector plates 42 may be positioned in an asymmetric manner in the chamber, which has the surprising effect of an improved ionizing rate achieved by the ionizing device 1. Preferably, the distance between an emitter electrode 41 and the motor 37 (shown in FIG. 2) of the fan 4 may be larger than the distance between an emitter electrode 41 and one of the collector plates 42, which e.g. may be achieved by the arrangement of the emitter electrodes 41 and the collector plates 42 according to the present example.

When an electric potential is applied to the emitter electrodes 41, an electromagnetic (EM) field is formed generally between the emitter electrodes 41 and the collector plate electrodes 42. When molecules and/or air borne particles pass the EM field in the chamber, they may be ionized. With the ionizing device 40 according to the present example, the magnitude of the EM field strength is larger towards the side wall 43 than in the middle of the chamber, which is advantageous in that the EM field is concentrated where most of the air passes the chamber and the risk of the motor 37 of the fan being charged by the EM field is reduced.

Preferably, the air purifier device 1 may be configured to apply a constant negative electric potential to the emitter electrodes 41, whereby mostly negative ions (anions) are created. Preferably, an electric potential around −7 kV may be applied. Lower electric potentials, such as around −20 kV may increase the output of ozone. However, applying an alternating voltage over emitter-collector pairs comprised in the air purifier device may alternatively be envisaged.

Figure 5:
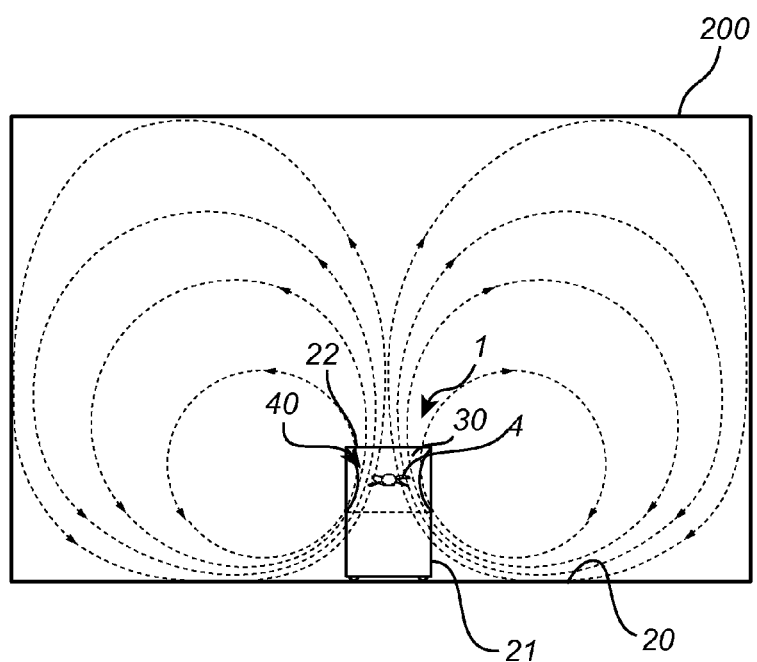
FIG. 5 schematically illustrates the air purifier device in operation in a room.

With reference to FIG. 5, an example of operation of the air purifier device 1 will be described. FIG. 5 shows the air purifier device 1 positioned on a floor 20 in a room 200. Preferably, the air purifier device 1 may be positioned to be spaced apart from the walls of the room 200. When the fan 4 operates, air is taken in through the air intake 21 laterally around the lower part of the air purifier device 1 and is then conducted upwards by the fan duct 30 to the exhaust 22 where the air is exhausted partly upwards and partly laterally. The shape of the fan duct 30 having flared end portions promotes the air circulation in the room 200 as illustrated in FIG. 5, as the air is directed to better follow the room shape. Air is directed slightly upwards and sideways from the exhaust 22, is guided along the ceiling, the walls and the floor 20 of the room 200 and is then taken in slightly from below and sideways via the air intake 21, whereby turbulence in the air circulation in the room can be reduced. The improved air circulation in turn improves the air purification in the room 200.

The air may pass the ionizing device 40 before exiting the exhaust 22, whereby air borne particles in the air flow may be ionized. Some of the ionized particles may then adhere to the collector plate electrodes 42 and some may follow the air flow out of the air purifier device 1 and back to the air intake 21 of the air purifier device 1 whereupon the particles adhere to the filter. Some ionized particles may be attracted to each other and form clusters, which may be retrieved to the air purifier device 1 by the air flow. Due to the improved air circulation achieved by the fan duct 30, an increased amount of the exhausted ionized particles and clustered particles are retrieved to the air purifier device 1 instead of adhering to the ceiling, walls and/or floor of the room 200, where they may be neutralized. Some of the particles adhered to the walls in that way may subsequently dislodge from the wall and pollute the air again. Further, as the ionizing device 40 is arranged downstream relative to the fan 4, the fan 4 is less (or even not at all) charged by the ionized particles.

In an embodiment, the air purifier device 1 may comprise a coupling mechanism 10 for securing the fan unit 2 on top of the filter unit 3. The coupling mechanism 10 will be described in more detail with reference to FIGS. 6 and 7.

Figure 6:
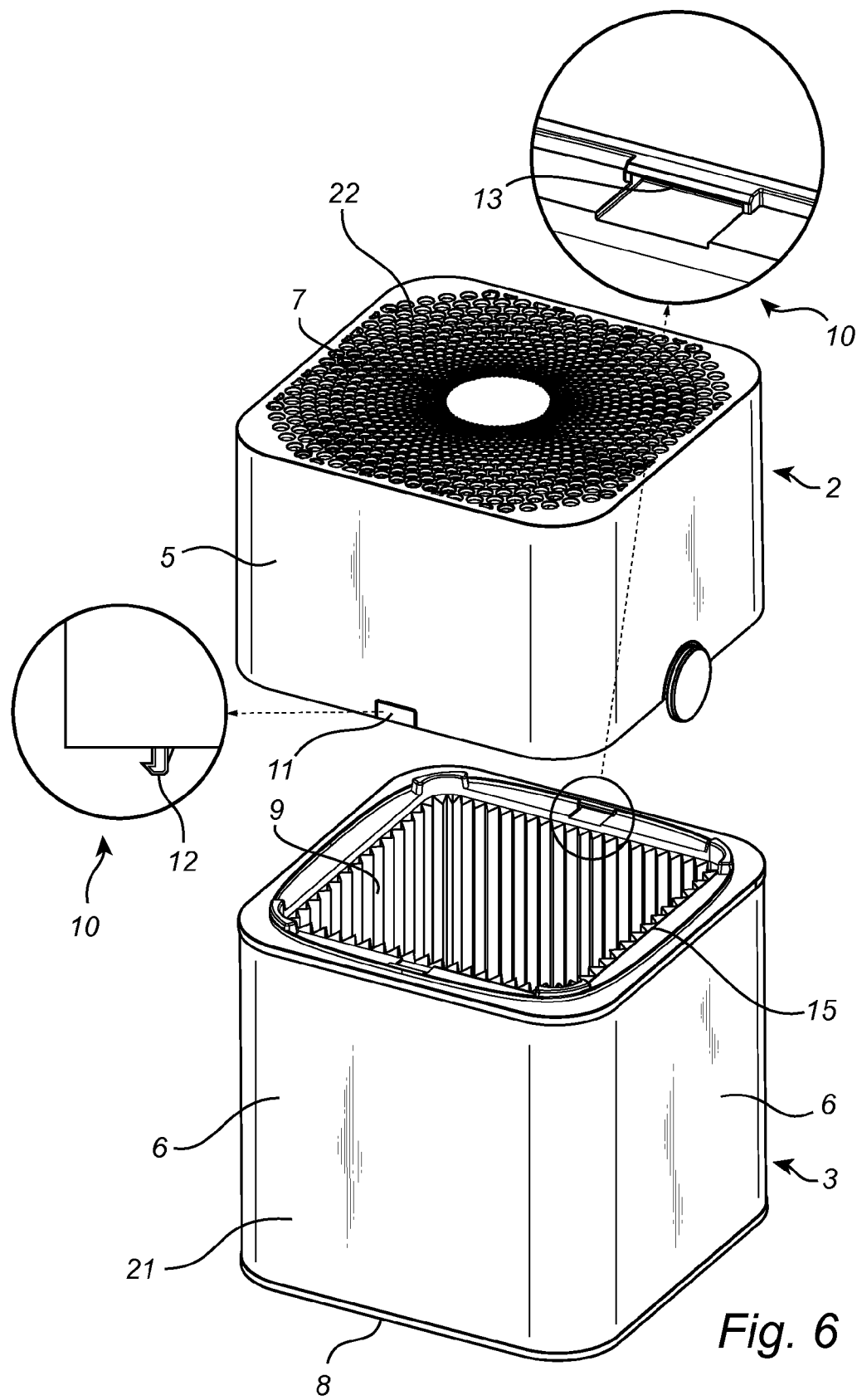
FIG. 6 shows the air purifier device of FIG. 1 with a fan unit separated from a filter unit of the air purifier device and enlargements of engagement parts of a coupling mechanism of the air purifier device.
Figure 7:
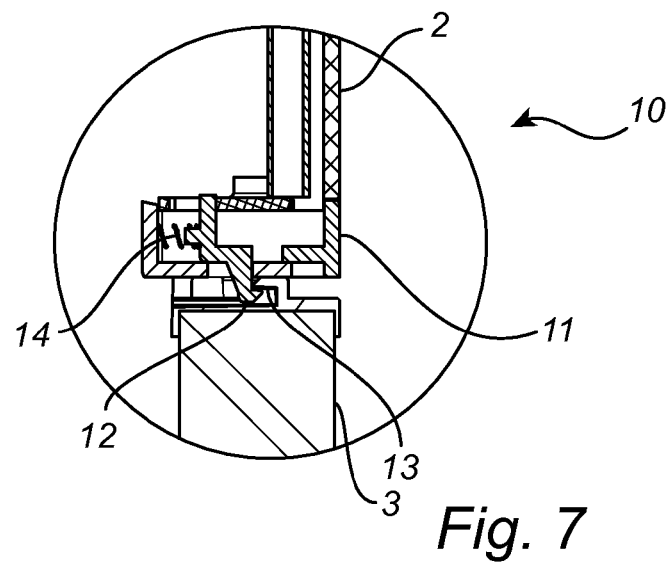
FIG. 7 is an enlarged cross-sectional view of the coupling mechanism of the air purifier device.

The coupling mechanism 10 may comprise two release means 11 (or release actuators) arranged on opposite outer sides of the side wall 5 of the fan unit 2. The release means 11 may e.g. be formed by release buttons, as illustrated in FIGS. 6 and 7. Alternatively, the release means 11 may be formed by e.g. release levers or the like. Each release means 11 may be coupled to a fan engagement part 12 arranged in the fan unit 2 and adapted to engage with a filter engagement part 13 arranged in the filter unit 3. For example, the filter engagement part 13 may comprise a recess and the fan engagement part 12 may be shaped as a hook adapted to mate in the recess, or vice versa. Further, the fan engagement part 12 may be movable by actuation of the release means 11, such as by pushing the release button 11, into an unengaged position, in which the fan engagement part 12 does not engage the filter engagement part 13. In this unengaged position, the fan unit 2 can be removed from the filter unit 3. A resilient means 14, such as a spring, may be arranged to urge the fan engagement part 12 into a position in which it is able to engage the filter engagement part 13 when the fan unit 2 is positioned on the filter unit 3. The fan engagement part 12 may be integrated in the same component as the release means 11, such as moulded in the same piece of plastic.

The filter unit 3 may comprise a geometric feature, such as an edge 15, adapted to mate with a corresponding geometric feature in the fan unit 2 (not shown) for facilitating mating the fan unit 2 in the right position on top of the filter unit 3.

In an embodiment, the whole filter unit 3 may be a disposable. Hence, for changing filter 9 of the air purifier device 1, the whole filter unit 9 may be replaced by a new filter unit. Alternatively, the filter 9 may be removably arranged in the filter unit 3, thereby enabling a user to remove the filter 9 from the filter unit 3 to replace it by a new filter. For example, the filter 9 may be arranged to be slid into the side wall 6 of the filter unit 3, preferably from above in a direction along the longitudinal axis 100 of the air purifier device 1 (not shown).

Figure 8:
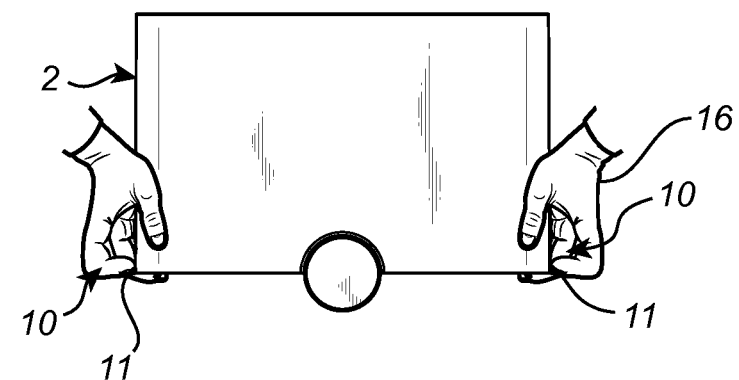
FIG. 8 illustrates the fan unit being removed from the filter unit by a user.
Figure 8:
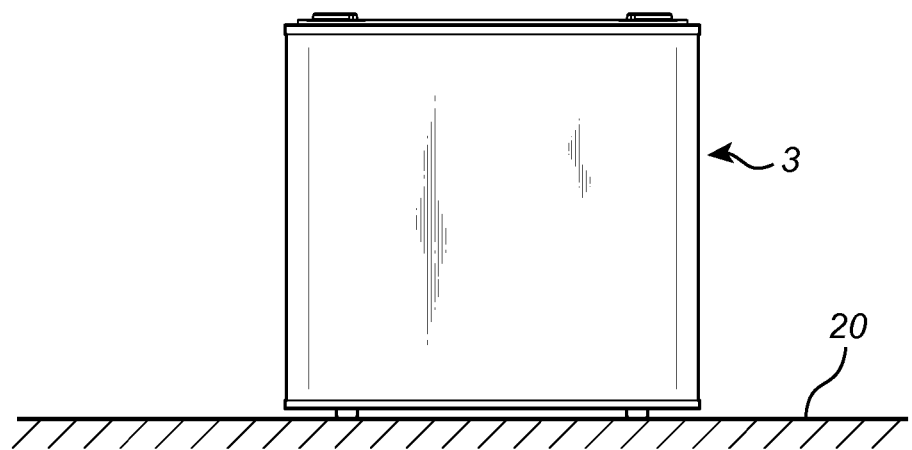

With additional reference to FIG. 8, operation of the coupling mechanism 10 for changing filter 9 will be described. A user 16 may put both hands on opposite sides of the fan unit 2 and simultaneously push (or in any other way actuate) the release means 11 and pinch (or grab) the fan unit 2. When the release means 11 are actuated, the fan engagement part 12 becomes unengaged with the filter engagement part 13, whereby the user 16 may lift the fan unit 2 off the filter unit 3.

The user may then position the fan unit 2 on top of a new filter unit (in case the filter unit 3 is a disposable filter unit 3). Alternatively, the user may remove the filter 9 from the filter unit 3 and insert a new filter (in case merely the filter being disposable).

Then the fan unit 2 may be attached to the filter unit 3 (or on a new filter unit) again. The boxed shape of the fan unit 2 and the filter unit 3 and/or the edge 15 may help (guide) the user to get the fan unit 2 in a correct position on the filter unit 3. Optionally, the release means 11 may be actuated (e.g. pushed) by the user when the fan unit 2 is mated with the filter unit 3 and the released when the fan unit 2 is in position on the filter unit 3. Alternatively, the fan engagement part 12 may comprise a slated edge (as shown in FIG. 7), whereby the fan engagement part 12 may be automatically pushed towards the unengaged position when approaching the recess 13. The user may then not necessarily actuate the release means 11 when putting the fan unit 2 back on top of the filter unit 3.

The person skilled in the art realizes that the present invention by no means is limited to the embodiments described above. On the contrary, many modifications and variations are possible within the scope of the appended claims.

Further, the air purifier device may comprise an alternative fan duct (or even no fan and/or no fan duct at all), such as a non-flared fan duct or any other kind of fan duct.

Further, the air purifier device may not necessarily be structurally separated in two parts (fan and filter unit) or may comprise an alternative coupling mechanism (or even no coupling mechanism at all) such as of a screw or bolt type attachment mechanism or any other convenient coupling mechanism.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. Air purifier device comprising:
   a chamber defined by a side wall arranged to guide an air flow through the air purifier device, the chamber extending in a longitudinal direction and possessing a central axis in the longitudinal direction, and
   at least one emitter electrode and at least one collector plate electrode arranged to ionize airborne particles,
   wherein the at least one emitter electrode is arranged to extend directly from the side wall, inwards in the chamber towards the central axis of the chamber, and transverse to the air flow,
   wherein the at least one collector plate electrode is arranged to extend directly from the side wall, inwards in the chamber towards the central axis of the chamber, and transverse to the air flow, and
   wherein the at least one emitter electrode is located at a same position as the at least one collector plate electrode in the longitudinal direction of the chamber.

2. The air purifier device as defined in claim 1, wherein the at least one collector plate electrode extends along a main direction of the air flow.

3. The air purifier device as defined in claim 1, comprising at least two emitter electrodes and at least two collector plate electrodes, wherein the at least two emitter electrodes are arranged alternatingly with the at least two collector plate electrodes.

4. The air purifier device as defined in claim 1, comprising three emitter electrodes and two collector plate electrodes, wherein each one of the two collector plate electrodes is arranged between two of the three emitter electrodes.

5. The air purifier device as defined in claim 1, wherein a first one of the emitter electrodes is arranged opposite to a second one of the emitter electrodes,
wherein a first one of the two collector plate electrodes is arranged between the first emitter electrode and a third one of the emitter electrodes, and
wherein a second one of the two collector plate electrodes is arranged between the second emitter electrode and the third emitter electrode.

6. The air purifier device as defined in claim 1, further comprising a fan for producing the air flow, and a motor for driving the fan.

7. The air purifier device as defined in claim 6, wherein each emitter electrode is arranged closer to at least one of the two collector plate electrodes than to the motor.

8. The air purifier device as defined in claim 6, wherein the chamber is arranged on a downstream side of the fan.

9. The air purifier device as defined in claim 1, wherein the side wall is flared towards an air exhaust of the air purifier device.

10. The air purifier device as defined in claim 1, wherein portions of the side wall at which the emitter electrodes are arranged are arranged further from a centre of the chamber than portions of the side wall at which the collector plate electrodes are arranged.

11. The air purifier device as defined in claim 1, wherein the side wall has at least one jutting portion, in which one of the emitter electrodes is arranged.

12. The air purifier device as defined in claim 1, wherein the chamber has a rotational symmetric shape.

13. The air purifier device as defined in claim 1, wherein the side wall of the chamber comprises an electrically insulating material.

14. The air purifier device as defined in claim 4, wherein the three emitter electrodes are brush electrodes.

15. The air purifier device as defined in claim 1, wherein
the chamber defined by the side wall arranged to guide the air flow through the air purifier possesses an interior diameter, and
the at least one emitter electrode and the at least one collector plate electrode extend directly from the side wall by a distance less than the interior diameter of the chamber defined by the side wall.

* * * * *